United States Patent [19]

Lavieville et al.

[11] Patent Number: 5,726,870
[45] Date of Patent: Mar. 10, 1998

[54] ELECTRONIC CIRCUIT FOR CONVERTING ELECTRICAL ENERGY

[75] Inventors: Jean-Paul Lavieville, Gif Sur Yvette; Olivier Bethoux, St Germain Les Arpajon; Philippe Carrere; Thierry Meynard, both of Toulouse, all of France

[73] Assignee: GEC Alsthom Transport SA, Paris, France

[21] Appl. No.: 687,605

[22] PCT Filed: Dec. 28, 1995

[86] PCT No.: PCT/FR95/01749

§ 371 Date: Aug. 8, 1996

§ 102(e) Date: Aug. 8, 1996

[87] PCT Pub. No.: WO96/21268

PCT Pub. Date: Jul. 11, 1996

[30] Foreign Application Priority Data

Dec. 29, 1994 [FR] France .................. 95 15865

[51] Int. Cl.[6] .................................................. H02M 3/06
[52] U.S. Cl. ................................................................ 363/62
[58] Field of Search ........................... 363/39, 59, 60, 363/62

[56] References Cited

U.S. PATENT DOCUMENTS

| 5,227,962 | 7/1993 | Marsh | 363/39 |
| 5,345,376 | 9/1994 | Noubakhsh | 363/62 |
| 5,532,575 | 7/1996 | Ainsworth et al. | 323/211 |
| 5,581,454 | 12/1996 | Collins | 363/59 |

FOREIGN PATENT DOCUMENTS

2679715A1   1/1993   France .

Primary Examiner—Matthew V. Nguyen
Attorney, Agent, or Firm—Sughrue, Mion, Zinn, Macpeak & Seas, PLLC

[57] ABSTRACT

A multilevel converter comprising, in particular, one capacitor (C1, C2, ..., Cn) and two switches (T1, T'1; for example) in each of its cells. The cells operate successively in a period that repeats at a converter frequency. In parallel with the load (C), a filter circuit (CF) is provided to dissipate the energy of any component having a fundamental frequency that corresponds to said converter period. The filter comprises one or more RLC type series circuits.

5 Claims, 3 Drawing Sheets

ELECTRONIC CIRCUIT FOR CONVERTING ELECTRICAL ENERGY

This application is a 371 of PCT/FR95/01749 filed Dec. 28, 1995.

BACKGROUND OF THE INVENTION

1. Field of the Invention

The present invention relates to electronic circuits for converting electrical energy of the type described in French application FR 2 679 715 A1, and to a power supply installation making use thereof.

2. Description of the Related Art

The converter described in that patent application is shown, by way of example, in accompanying FIG. 1. It essentially comprises, between a voltage source SE and a current source C, a succession of controllable switching cells CL1, CL2, ..., CLn, each having two switches T1, T'1; T2, T'2; ...; Tn, T'n, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, ..., Cn for each cell, except that the capacitor of the last cell may be omitted when said voltage source SE is suitable for performing the same role, each capacitor is connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lcl), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number n of cells, i.e. $2\pi/n$, which is optimal with respect to harmonics generated on the output and which enables the voltages charged on the capacitors of the converter to be balanced naturally. Some other offset is nevertheless conceivable.

In such a converter, the successive capacitors C1, C2, ..., Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

The term "multilevel converter" is used below to designate a converter that satisfies the above description.

The object of the present invention is to make provision in such a multilevel converter for the charge on each capacitor to remain in compliance with the above description, in spite of inevitable departures from nominal operating conditions.

To examine more easily how the charge ought nominally to vary on one of the capacitors of a multilevel converter as described above, reference is made to FIG. 2 which shows an arbitrary switching cell CLk together with its switches Tk and T'k, the capacitor Ck associated with the cell, and also the following cell CLk+1 and its switches Tk+1 and T'k+1.

Given the coupling between the switches within each cell, Tk and T'k or Tk+1 and T'k+1, the set of two adjacent cells CLk and CLk+1 shown in FIG. 2 has four states:

a) a first state where Tk and Tk+1 are non-conducting, so the charge on Ck does not change;

b) a second stage where Tk and Tk+1 are both conducting, so the charge voltage on Ck does not change either, since under those circumstances T'k and T'k+1 are non-conducting;

c) a third state where Tk is conducting and Tk+1 is non-conducting, in which case the current source C forces a current Ik which is equal to I to flow through Tk while the current I'k through T'k is zero. It is the state of Tk+1 that forces the current Ik+1 to be zero, while the current I'k+1 is equal to I so the current I'ck through the capacitor Ck is equal to I; and d) a fourth state where Tk is non-conducting and Tk+1 is conducting, so the current source C forces a current I'k equal to I through T'k while the current Ik through Tk is zero. The state of Tk+1 forces a current Ik+1 to be equal to I, while the current I'k+1 is zero, so the current Ick through the capacitor Ck is equal to I.

The currents I'ck=I'k+1 and Ick=Ik+1 deliver additional charge of opposite signs to the capacitor Ck in the above third and fourth states; the first situation is said to be negative and the second positive. The currents corresponding to these two states are forced by the current source. If the current source forces an exactly accurate DC, and everything else remains equal, then the currents forced by the current source during stages c) and d) are the same and in opposite directions at all times throughout the conduction periods of Tk and Tk+1 (which are nominally equal and offset in time, as mentioned above). This means that the charge on Ck is changed positively and then negatively by equal amounts, so it does not vary over one period of the converter.

The currents Ick and I'ck are determined by the voltage of the voltage source, the current through the current source, and the charge voltage Vck on capacitor Ck. In more general terms, when the impedance of the current source is not infinite, the current through the current source depends on the voltage across its terminals and thus on the voltages Vck on the capacitors. For example, if it should happen that the charge voltage Vck is higher than its nominal value VE×k/n, for whatever reason, then there will result a discharging current I'ck tending to be greater and a charging current Ick tending to be smaller than they ought to be nominally, thereby tending to return the charge on the capacitor Ck to the value it ought to have. This explains that the operation of the multilevel converter is stable and can accommodate variations in amplitude, in either direction, both at the voltage source and at the current source. It is explained below that this nevertheless gives rise to problems in dynamic terms.

FIG. 3 is an example of operation of the multilevel converter of FIGS. 1 and 2 for situation when n=3; pulse width modulation (PWM) type control is applied in order to deliver a sinusoidally modulated alternating voltage to the current source C, i.e., during successive periods p1, p2, p3, ... In the operation of the converter (FIG. 3(a), the switches T1, T2, and T3 are successively conductive during time intervals that vary in accordance with a wave for modulating the output voltage, referred to below as the "modulating" wave. At each instant, the corresponding switches T'1, T'2, and T'3 are in the opposite positions. See FIGS. 3(b)–3(g).

Naturally, other modes of modulating the operation of the switches make it possible to obtain the same result, as is well known. Also clearly, the converter may also serve to deliver the current source C with any other waveform or with a regulated DC voltage.

Consideration is given initially to the period p1 in the operation of the converter. During this period, while any one of the switches T1, T2, and T3 is conducting, the other two are non-conducting. For each set of two cells and the capacitor between them, this corresponds to above-described states c) and d), in which the capacitor receives successive additional negative and positive charge, with the total value thereof being nominally zero. It should also be observed that while the adjacent cells CL1 and CL2 are in state d), adjacent cells CL2 and CL3 are in state c) such that capacitor C1 receives additional positive charge from the same current that provides additional negative charge to capacitor C2.

FIG. 3 also shows, by way of example, how the multilevel converter operates during periods p2, p3, etc. ..., during which the conduction periods of the switches T1, T2, T3 become shorter, and then become longer until they exceed one-third of a period, in which case they overlap. FIG. 3(h) shows the voltage that would ideally be transmitted to the current source, in particular if the capacitance of the capacitors was such that the additional charge in question did not significantly alter the voltage across their terminals. The voltage VI is expressed in fractions of the voltage VE from the voltage source SE, taking the negative pole of the voltage source SE as the voltage reference. It can be seen that this voltage VI contains both a large fundamental at a chopper frequency Fd which is the frequency of the converter, and also lower-amplitude harmonics at frequencies higher than the chopper frequency which are easily eliminated by a lowpass filter.

Since the current is variable, states c) and d) mentioned above will not convey equal additional amounts of charge to the capacitors of the converter, since between the above two states, the current will have had time to vary. Such variation is negligible only if the operating period of the switches is significantly greater than the frequency of the modulating wave.

It should also be expected that the AC supplied to the current source will not be exactly sinusoidal, but will be distorted in an asymmetrical manner. Likewise, errors in the levels of the control signals or in the signals they generate, or indeed differences in the switching times of the various switches involved, inevitably cause switch conduction durations to be unequal over an operating period of the converter, or will shift the conduction stages of the switches in time, or else will unbalance the currents charging and discharging the capacitors. Consequently, and in general, it is not possible in practice with a multilevel converter of the type described to guarantee that nominal operating conditions as described initially will, in fact, be satisfied. Unfortunately, a persistent error in additional charge will lead to an error in one direction or the other in the charge on a capacitor, and thus to an error in its mean charge voltage, thereby giving rise to distortion at the operating frequency of the converter in the voltage delivered to the current source.

This effect is illustrated by trace VI' in FIG. 3(i) which is similar to trace VI with the exception that capacitor C1 (FIG. 1) which is assumed to be charged to a voltage that is smaller than its nominal charge voltage prevents the converter from delivering pulses vi1, vi2, vi3 of constant amplitude, with the converter supplying, instead, pulses such as vi1' that are of smaller amplitude (the scale is exaggerated to make it more readable) whenever the capacitor C1 is delivering its own charge voltage to the current source C, and pulses such as vi2' of greater amplitude whenever the capacitor C1 is subtracting its own voltage from the voltage delivered to the current source C, and finally also pulses such as vi3' of unchanged amplitude whenever the capacitor C1 is not in the circuit. It is thus easy to see that this introduces into the signal VI' a disturbing component at the chopper frequency.

FIG. 4 shows an example of the spectrum of such a disturbing component, in a converter having seven stages, and there can be seen a line at a chopper frequency Fd, i.e. the frequency of the converter, plus lines at frequencies 2Fd, 3Fd, etc.

Such lines do not exist when the capacitors are charged to their respective nominal voltages. When they do appear, they are generally harmful.

However, and above all, the voltages to which the switches are subjected are no longer substantially equal to the differences between the nominal charge voltages of two adjacent capacitors, i.e. the voltage of the voltage source divided by the number of stages in the converter. This can put the switches in danger.

Naturally, and as mentioned above, errors in charge on the capacitors tend spontaneously to be reabsorbed, but that process takes time.

In addition, the spontaneous process is implemented via the current source. It therefore cannot have effect when the current source is not forcing a current, and in any event it will be slowed down whenever the current flowing through the current source is small.

On the basis of the above observations, the present invention proposes a multilevel converter in which the mean charge on each capacitor of the converter is better maintained at its nominal value.

SUMMARY OF THE INVENTION

According to the invention, this result is achieved by a multilevel converter as described above, which further comprises, in parallel with the current source, a filter circuit for preferentially dissipating, at least in part, the energy of any component having a frequency lying in a frequency band going from the fundamental frequency of the voltage applied to the current source to a frequency equal to n times the converter frequency, also referred to as the chopper frequency, where n is the number of stages in the converter, the fundamental frequency and the frequency equal to the chopper frequency times n not being included in the frequency band.

In an embodiment, the filter circuit includes at least one RLC type series circuit. Provision may also be made for a plurality of LC series circuits in series with a common resistor. However provision may also be made for a plurality of RLC series circuits in parallel.

Advantageously, for each RLC series circuit under consideration, the resistance of the resistor is low enough to dissipate said energy as quickly as possible, but high enough to prevent excessive current damaging the switches of the converter.

BRIEF DESCRIPTION OF THE DRAWINGS

The various objects and characteristics of the present invention appear more clearly in the following description of embodiments of the invention given by way of non-limiting example and made with reference to the accompanying figures, in which:

FIG. 3(a)-3(i), described above, are waveform diagrams showing operation of the multilevel converter of FIGS. 1 and 2, for the case where it comprises three stages;

DESCRIPTION OF THE PREFERRED EMBODIMENTS

Reference is made to the discussion presented above for a description of a multilevel converter. The diagrams of FIGS. 1, 2, and 3 correspond to a converter of the type described in patent document FR 2 697 715 A1, to which the reader can refer for more ample details. FIG. 4 gives an example of the disturbing components which the present invention proposes a solution for elimination of those disturbing components.

Figure 1:
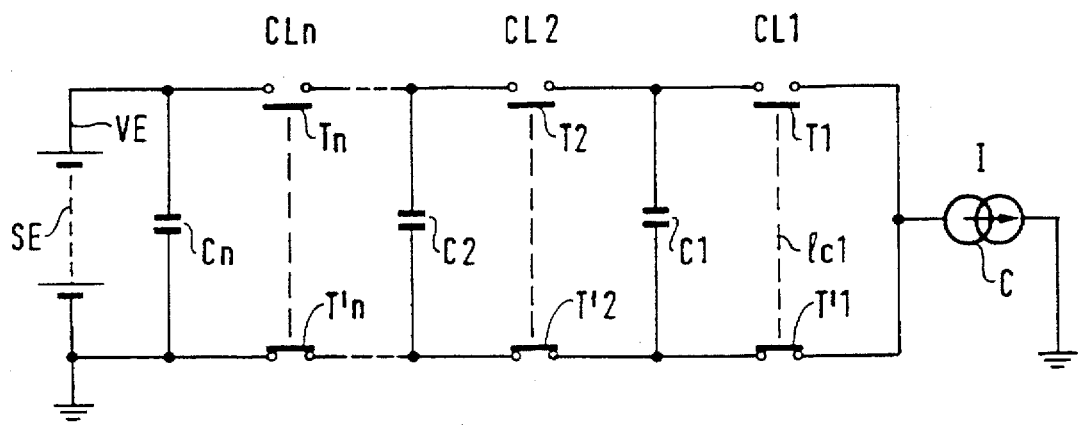
FIG. 1, described above, is the circuit diagram of a known multilevel converter.
Figure 2:
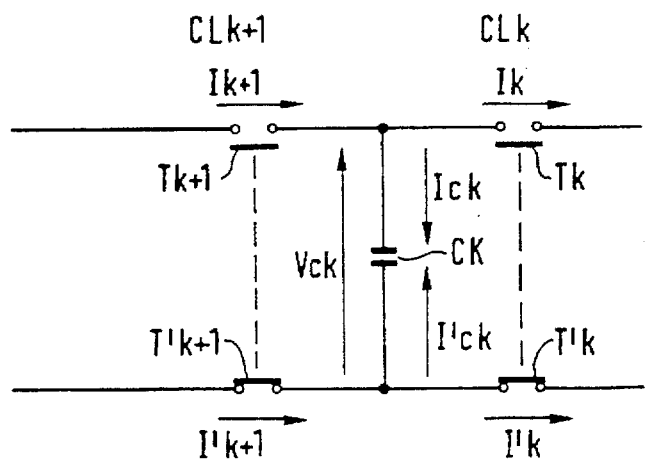
FIG. 2, described above, is the circuit diagram of a set of two adjacent stages in the multilevel converter of FIG. 1.
Figure 5:
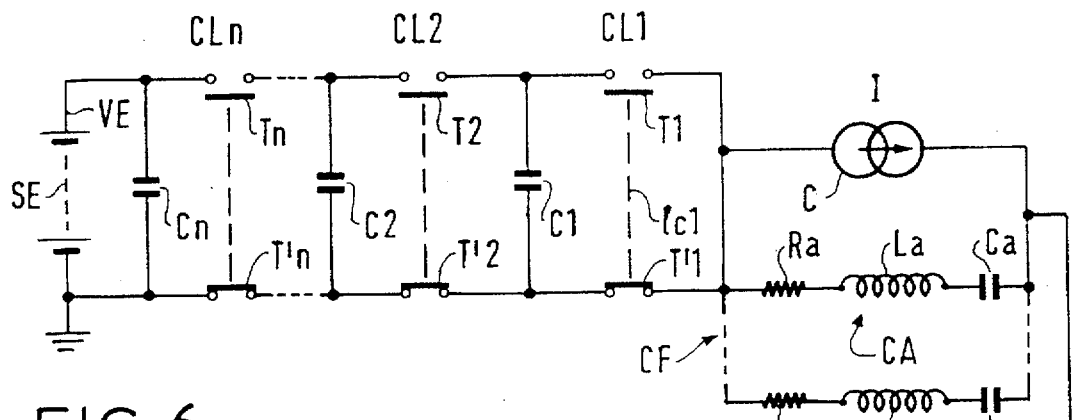
FIG. 5 is the circuit diagram of a multilevel converter of the type of FIGS. 1, 2, and 3, and modified by a first implementation of the present invention.

FIG. 5 shows the FIG. 1 converter in which the corresponding elements are given the same reference symbols. At the output of the converter, i.e. in parallel with the current source, there is added to the converter a filter circuit CF for dissipating preferentially, and at least in part, the energy of any component at a frequency lying in a frequency band running from the fundamental frequency of the voltage applied to the current source to a frequency equal to n times said converter frequency, also referred to as the "chopper" frequency, where n is the number of stages in the converter, and with the fundamental frequency and the frequency equal to n times the chopper frequency not lying within said frequency band.

More precisely, the filter circuit comprises one or more RLC type series circuits, each comprising a resistor Ra, Rm, an inductor La, Lm, and a capacitor Ca, Cm.

Figure 6:
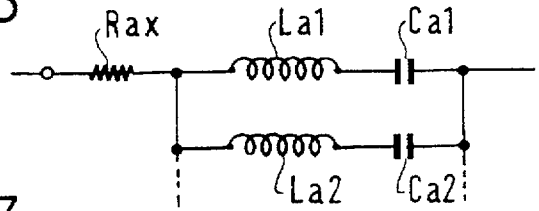
FIG. 6 is a fragmentary circuit diagram showing a variant of the FIG. 5 converter.

In a variant, as shown in FIG. 6, a common resistor Rax is provided in series with a plurality of series resonant circuits La1, Ca1; La2, Ca2. Compared with the solution of FIG. 5, this variant is cheaper but more difficult to implement in practice.

Figure 3A:
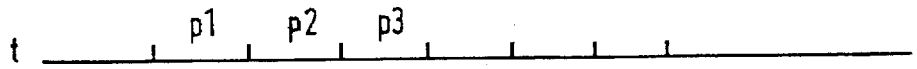
Figure 3A:
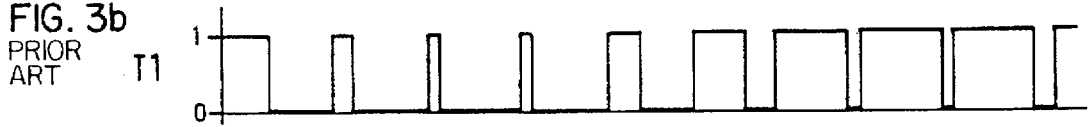
Figure 3A:
Figure 3A:
Figure 3A:
Figure 3A:
Figure 3A:
Figure 3A:
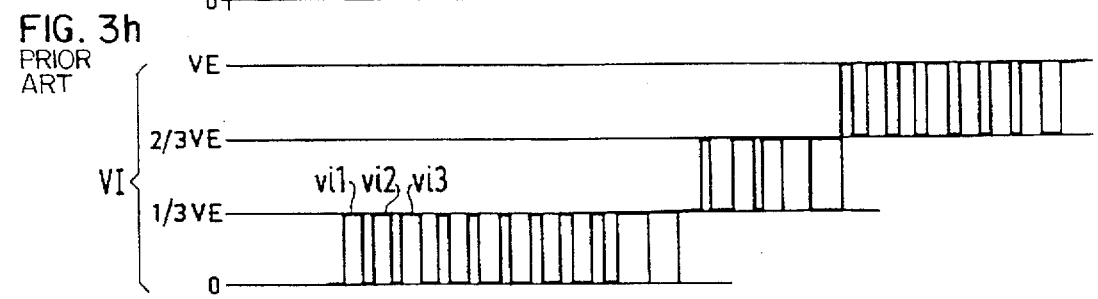
Figure 3A:
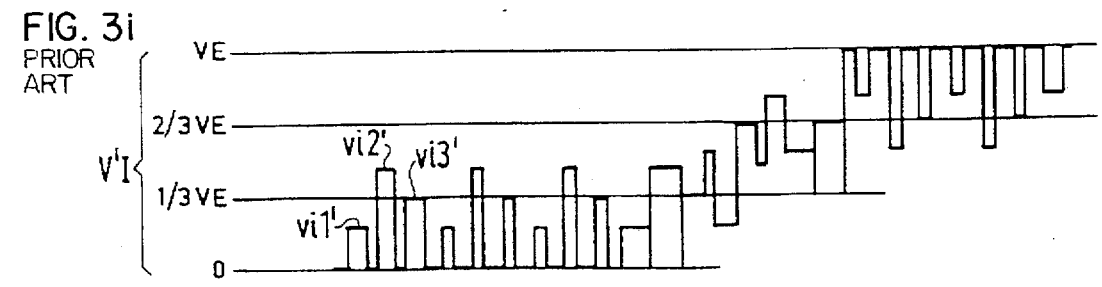
Figure 4:
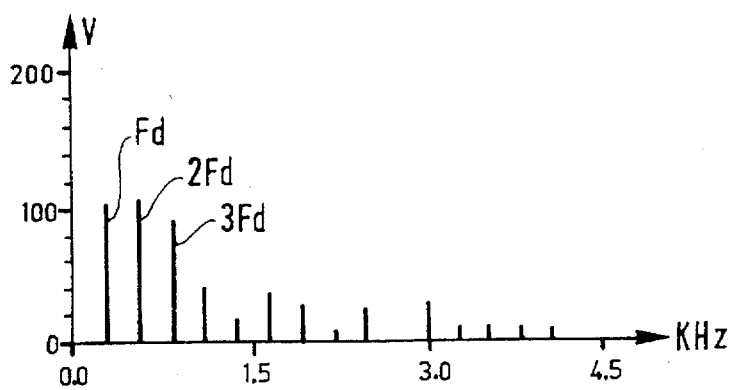
FIG. 4 shows an example of the voltage spectrum output by the converter of FIG. 1 in the event of charge unbalance on a capacitor, as applicable to a converter having seven stages.

Ideally, the filter circuit CF should have infinite impedance up to the fundamental frequency of the voltage supplied to the current source by the converter, zero impedance above the fundamental frequency of the voltage supplied to the current source by the converter up to, but not including, the frequency nFd which corresponds to the operating frequency of the converter multiplied by the number of cells in the converter (see pulses vi1, vi2, vi3, in FIG. 3(h), and infinite impedance at higher frequencies.

In order to avoid the switches in the converter having to carry excessive current, zero impedance is not desirable. The minimum resistance of the resistors Ra, Rm, Rax is defined on this basis: in certain applications it may be of the order of one ohm.

Figure 7:
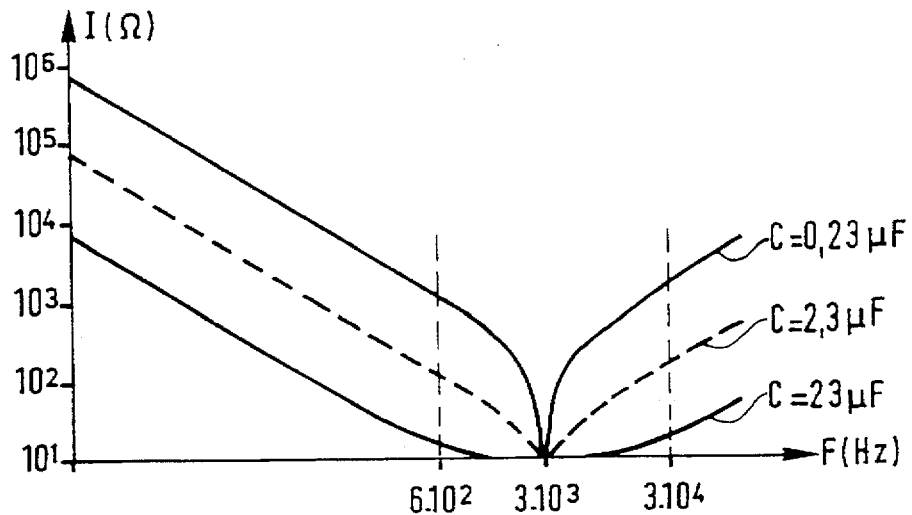
FIG. 7 is a graph in which the curves show the impedance/frequency (Z/F) response of various RLC circuits tuned to the same frequency, but with various capacitances and inductances.

An infinite impedance in a given range and low impedance in other ranges is not possible. The invention therefore provides for at least one series resonant circuit. The frequency response of such a circuit is illustrated in FIG. 7 which gives curves of impedance (Z) as a function of frequency (F) for three RLC circuits all having a resistance R of 10 ohms and capacitances C of 23 µF, 2.3 µF, and 0.23 µF. The inductance values are such as to provide resonance in each case at a frequency of 3 kHz.

It can be seen that at 600 Hz, the impedance of the circuit is about 10 $\Omega$, $10^2$ $\Omega$, or $10^3$ $\Omega$. The spread of values is similar at 30 kHz. For a small capacitance (0.23 µF) and for a correspondingly high inductance there is a pronounced V-shape. The advantage of small capacitance is that impedance is high outside the frequency band containing the spectrum of any possible disturbing components. The disadvantage is that within the band, impedance is low only at the fundamental of the components. One solution of the invention, as illustrated in FIG. 5, is to provide a plurality of RLC circuits in parallel, e.g. one for each of the large-amplitude lines in FIG. 4, with the other lines being ignored. However that solution requires numerous RLC circuits that are expensive and bulky, and that dissipate power. The solution of FIG. 6 is, in fact, similar.

However, in certain applications (relatively low voltage, in which case the dissipated power may be proportionally greater, disturbing components of limited amplitude), the invention therefore also provides for choosing a greater capacitance C, thereby spreading out the V-shaped characteristic and enabling the number of RLC circuits to be reduced, or even, in the limit, enabling only one such circuit to be used.

Clearly the above description is given purely by way of non-limiting example and numerical values, in particular, may be changed for each application.

We claim:

1. A multilevel converter comprising:

a voltage source (SE);

a current source (C);

a succession of n controllable switching cells (CL1, CL2, ..., CLn) disposed between said voltage source and said current source, an upstream direction being defined in a direction from said voltage source to said current source and a downstream direction being defined in a direction from said current source to said voltage source, each of said controllable switching cells comprising two switches (T1, T'1; T2, T'2; ... ; Tn, T'n), wherein each of said switches comprises two poles, an upstream pole disposed in an upstream direction of each of said controllable switching cells and a downstream pole disposed in a downstream direction of each of said controllable switching cells, such that each of said controllable switching cells, each having said two switches, includes a pair of upstream poles and a pair of downstream poles, said switches of said controllable switching cells being disposed so that said pair of downstream poles of a first controllable switching cell is connected to said pair of upstream poles of a second controllable switching cell disposed downstream of said first controllable switching cell, further wherein said upstream poles of a controllable switching cell CLn, where n=1, are connected to said current source and said downstream poles of a last controllable switching cell CLn is connected to said voltage source;

n capacitors, wherein each of said n controllable switching cells includes one of said n capacitors, said one of said capacitors being disposed between said pair of downstream poles in each of said n controllable switching cells, an nth capacitor being omitted when said voltage source performs the role of said nth capacitor, each of said n capacitors (C1, C2, ..., Cn) having successively increasing nominal mean charge voltages, a mean charge voltage for said one of said n capacitors in each of said controllable switching cells being equal to a product of a voltage (VE) from said voltage source multiplied by a reciprocal of n and by a rank of a controllable switching cell including said one of said n capacitors;

control means for governing the nominal operation of said converter by controlling said switches of said controllable switching cells wherein said two switches of each of said controllable switching cells are always in opposite conduction states, said control means providing a cell control signal to each of said controllable switching cells (CT1, CT2, ..., CTn) controlling one of said two switches of each of said controllable switching cells to be in a first conduction state and then in a second conduction state during a cyclically repeated period, said cell control signals being identical and offset in time by a fraction of said period, said two switches of each of said controllable switching cells operating in a same manner and offset in time by said fraction of said period; and a filter circuit (CF) disposed in parallel with said current source for dissipating, at least in part, energy of any component having a frequency lying in a frequency band having a range between a fundamental frequency of a voltage applied to said current source to a frequency equal to n multiplied by a frequency of said converter, said frequency of said converter being a chopper frequency and n being the number of stages in said converter, said fundamental frequency and said frequency equal to n multiplied by said chopper frequency not lying within said frequency band.

2. A multilevel converter according to claim 1, characterized in that said filter circuit (CF) comprises at least one RLC type series circuit comprising a resistor (Ra) and a series resonant circuit (La, Ca).

3. A multilevel converter according to claim 2, wherein said filter circuit (CF) comprises a common resistor (Rax) in series with a plurality of series resonant circuits (La1, Ca1; La2, Ca2).

4. A multilevel converter according to claim 2, wherein said filter circuit (CF) comprises a series resonant circuit for said converter frequency (Fd) and for at least some harmonics of said converter frequency present at relatively higher amplitudes.

5. A multilevel converter according to claim 2, wherein for any of said at least one RLC series circuit, resistance of the resistor is low enough to dissipate as quickly as possible energy supplied by the converter at a frequency corresponding to a frequency of resonance of any resonant circuit connected in series with the resistor, while simultaneously being high enough to avoid excessive current damaging the switches of the converter.

* * * * *